United States Patent [19]
Attwood

[11] Patent Number: 5,629,841
[45] Date of Patent: May 13, 1997

[54] LOW POWER DC-DC CONVERTER

[76] Inventor: Brian E. Attwood, 3 Peel House, Barttelot Road, Horsham, West Sussex, England

[21] Appl. No.: 505,194
[22] PCT Filed: Feb. 14, 1994
[86] PCT No.: PCT/GB94/00296
  § 371 Date: Oct. 20, 1995
  § 102(e) Date: Oct. 20, 1995
[87] PCT Pub. No.: WO94/18747
  PCT Pub. Date: Aug. 18, 1994
[51] Int. Cl.⁶ .......................... H02M 3/335; H02M 3/24; H02M 5/42; H02M 7/44
[52] U.S. Cl. .................................. 363/21; 363/95
[58] Field of Search .................... 363/19, 20, 21, 363/95, 97, 131, 18

[56] References Cited

U.S. PATENT DOCUMENTS

| | | | |
|---|---|---|---|
| 3,590,335 | 6/1971 | Tetar | 317/148.5 |
| 4,617,620 | 10/1986 | Speranza | 363/19 |
| 4,788,455 | 11/1988 | Mori et al. | 307/297 |
| 4,924,369 | 5/1990 | Varadi . | |
| 4,994,955 | 2/1991 | Schoofs et al. | 363/95 |
| 5,008,609 | 4/1991 | Fulkiage | 323/313 |
| 5,239,453 | 8/1993 | Remson | 363/19 |

FOREIGN PATENT DOCUMENTS 2111257  4/1990  Japan .

OTHER PUBLICATIONS

International Search Report dated Jun. 15, 1994 corresponding to International Application No. PCT/GB94/00296.

*Primary Examiner*—Peter S. Wong
*Assistant Examiner*—Bao Q. Vu
*Attorney, Agent, or Firm*—Ratner & Prestia

[57] ABSTRACT

The converter is a switch mode converter in which a primary transformer winding (12) is switched by a power switch (Q5). The transformer secondary is wound with a power output winding (14) and a reference winding (29). The power switch (Q5) is operated by IC (24) connected as a ring-of-three oscillator. Regulation is achieved by two feedback means. First, the voltage on the reference winding (29) is peak rectified and fed back (30) to control the oscillator (24). Secondly, a signal which is a function of the on-time of the power switch (Q5) modifies the operation of a reference voltage source (Q1, Q2). The converter is particularly adapted to operate over a wide range of input voltages (typically 24 V–60 V) and over a wide range of low power (typically 24 mW–850 mW).

11 Claims, 3 Drawing Sheets

LOW POWER DC-DC CONVERTER

FIELD OF THE INVENTION

This invention relates to dc-dc converters of very low power which can be manufactured at low cost. The invention is particularly, but not exclusively, applicable to the power supply requirements of the Integrated Services Digital Network (ISDN) Standards.

DESCRIPTION OF THE PRIOR ART

ISDN Standards for a global information network are very stringent and demanding. One aspect is the provision of a dc-dc converter for use in terminal equipment (TE) and providing isolation between the TE and the subscriber bus (S bus). During normal mode operation the TE can have multiple power sources which include up to 1W from the S bus, with input voltage in the range 24–42 V. Under restricted power conditions, the designated TE must operate between 380 mW and 25 mW. More critical still is the requirement under the restricted condition that the line activity detection circuitry in the TE must continue to operate while maintaining a power consumption of less than 25 mW. Since the necessary functions in the restricted condition require a power of at least 13 mW, it is apparent that a minimum efficiency of 55% is required from the converter. If a greater efficiency can be achieved, the increase in power available for the TE will ease limitations on the internal TE circuitry; for example, an efficiency of 65% would make 16 mW available.

It is known that several manufacturers have approached the implementation of such systems in the form of ASICs utilising CMOS technology, but in general these do not allow a system fully complying with CCITT requirements to be achieved. Moreover, the component cost of the integrated circuit alone would be of the order of USD2.00, and the surrounding circuitry (such as switching FET, transformer, output secondary circuit and feedback isolation) would raise the unit cost to the order of USD5.00. Such an order of cost is unlikely to be commercially acceptable.

SUMMARY OF THE INVENTION

It is accordingly an object of the present invention to provide a dc-dc converter which is capable of meeting ISDN requirements at a low cost.

The invention accordingly provides a dc-dc converter comprising:

an input for receiving an input voltage;

a transformer having primary and secondary windings;

switching means operative to switch the input voltage across the transformer primary winding;

oscillator means connected to the switching means to cause the switching means to operate repetitively;

an output coupled to the transformer secondary winding via a low-pass filter;

a control circuit for controlling the operation of the oscillator means to regulate the output voltage; and feedback means generating a feedback signal which varies with at least one parameter of the secondary side voltage;

said parameter being representative of the on-time of the switching means.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

Figure 1:
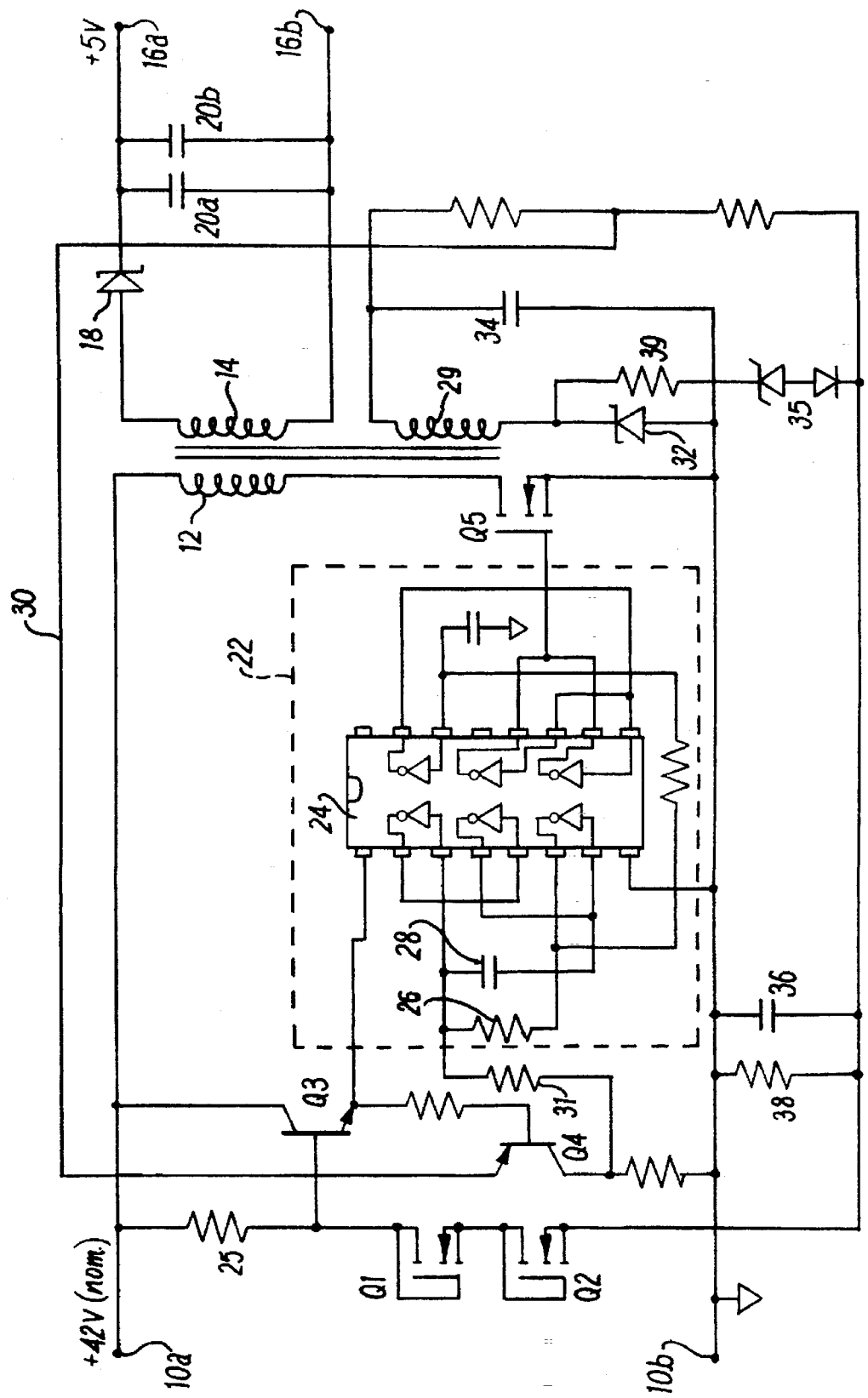
FIG. 1 is a circuit diagram of one embodiment of the present invention.

Referring to FIG. 1, a dc-to-dc converter has an input 10a, 10b for receiving a dc input at 40 V nominal. The input voltage is switched by a power switch transistor Q5 across the primary winding 12 of a coupling transformer. A transformer secondary winding 14 supplies a regulated 5 V dc output at 16a, 16b via a rectifier diode 18 and a low pass filter in the form of capacitors 20a, 20b.

The power switch transistor Q5 may suitably be a low gate threshold mosfet type ZVNL120A by Zerex. This has adequate Id continuous and Id peak ratings together with a 200 V Vds rating. This device is available in E-line and SOT23 format and typically exhibits a maximum gate threshold of 1.5 V. The gate charge requirements at 2.7 Vgs are 0.25 nC. In such a low power, high efficiency system the switching frequency should be as low as possible to reduce core losses and switching losses. A suitable compromise is about 25 kHz to keep out of audio frequencies. The present embodiment operates at 26 kHz, but up to 40 kHz is feasible if dictated by other requirements. At 26 kHz, the gate charge requirement of 0.25 nC for Q5 translates into 17 µW gate power requirement.

The power switch Q5 is controlled by an oscillator generally designated at 22 and comprising a CMOS integrated circuit 24 connected to operate as a ring-of-three oscillator. This form of oscillator has the advantage of a low power draw and substantially constant switching frequency. However, further modification is desirable to minimize power consumption.

To ensure minimum power requirements, components should have very high impedance. The IC device 24 itself should meet this requirement, and the device speed should be adequate but not excessive since high speeds would imply low internal impedance values which would increase power requirements unacceptably. Examples of suitable IC device are type HCF4049UB.

A further factor is that the ring-of-three circuit in its own right would not meet the most desirable requirements. At 25 mW input levels the 'on' time of the mosfet switch Q5 must be about 5% or less of the switching period, and at this extreme a standard ring-of-three circuit would have a switching frequency approaching zero. This is overcome in the present embodiment by providing an RC network consisting of resistor 26 and capacitor 28 connected to a spare gate to introduce a fixed propagation delay such that pulse widths at the output drive point to the mosfet Q5 can be reduced to as small as 1% without any substantial frequency change (typically less than 3%) over the range of 50% to 1% duty cycle.

The converter is regulated by feedback and operates essentially in flyback mode.

Devices commonly used in this art as reference voltage sources typically have a power requirement of the order of mA. Even if one assumes 1 mA dissipation, then such a device on the low voltage secondary would consume a few mW, whereas one connected to the 42 V primary would require 42 mW, which is greater than the total power available in the restricted condition. There are micropower reference sources available, but these are expensive and even a 50 μA drain, for example, would be excessive if taken direct from the input line.

The reference voltage source in this embodiment comprises a pair of very low power mosfets Q1, Q2 with gate and drain in series with a high value (typically 20 megohm) resistor 25. The gate-drain voltage drop, which is dictated by the gate threshold, thus acts as a reference voltage.

The resulting reference voltage will be spread-dependent to some extent, but in low gate threshold devices it can be held to 1.5 V plus or minus 100 mV, and adjusted for closer tolerance by simple resistor trimming on the output side voltage divider. Temperature dependency is also a factor: low gate threshold devices exhibit about 1% change in gate threshold per 5° C. change. This can be corrected to a first order over a useful range of temperatures by connecting the reference devices Q1, Q2 in combination with an emitter follower or source follower such as transistor Q3 which tends to cancel the temperature dependency. Another approach is described below with reference to FIG. 3.

The foregoing design of reference stage gives a dramatic reduction in reference operating current, which can be as little as 2 μA. This means that the reference voltage source can run continuously from the 42 V (nominal) input bus for only 84 μW input power, and do so using only low cost devices.

Turning to the stabilization of the output voltage, it is preferred that the converter provide isolation between the primary and secondary. This poses difficulties due to the very light load of 15 mW or so under emergency conditions. An obvious solution would be the use of opto-isolators, but in the present context these would entail unacceptable cost and power loss.

In the present embodiment, the basis of providing control in a simple manner is to have an additional secondary winding tightly coupled with the main secondary winding, rectify the voltage on this, and compare it with the reference.

Accordingly, the feedback signal is derived from an additional secondary winding 29, diode 33 by rectifier and fed back via line 30. The additional secondary winding 29 is preferably wound bifilar fashion with the main secondary winding 14. The feedback signal on line 30 is applied to transistor Q4 which acts as a comparator and generates a control signal applied via resistor 31 to modify the on time of the oscillator 22.

This provides a first order correction which would be sufficiently accurate under many conditions where reasonable mA loads on the reference winding 29 can be tolerated. However, in the case of the extremely low power draw and very large range of output power (typically 15 mW–850 mW) which is addressed by the present invention, great difficulty is experienced in obtaining good regulation of the output voltage.

The basis of the way in which the system of FIG. 1 overcomes this compensation problem is, in addition to obtaining the feedback reference voltage by peak rectifying the voltage on the reference winding 29 during the flyback cycle by means of diode 32 and capacitor 34, a load information reference is obtained by using the variable pulse width occurring during the on time of the power switch Q5, this on time being a function of load.

A zener diode 35 clamps the voltage at the reference winding 26 to 5 V peak. Provided that the voltage at this point is always greater than 5 V even when the input supply is at its minimum (in this example 24 V input on the primary), then as the primary supply increases the on time pulse will remain substantially at 5 V peak. This pulse of constant amplitude but load-dependent width is applied to a low pass filter network consisting of capacitor 36 and resistor 38 to produce a positive-going dc level which is applied to the bottom of the reference source Q1, Q2 in a manner that effectively tracks increasing loads in the correct ratio to hold the isolated main output voltage substantially constant over any input voltage and load combination.

The net result of this compensation and regulation scheme is that a very low dissipation, tight regulation feedback network is achieved at minimal cost; this is ideal for the ISDN application but is also applicable to a wide range of other uses.

Figure 2A:
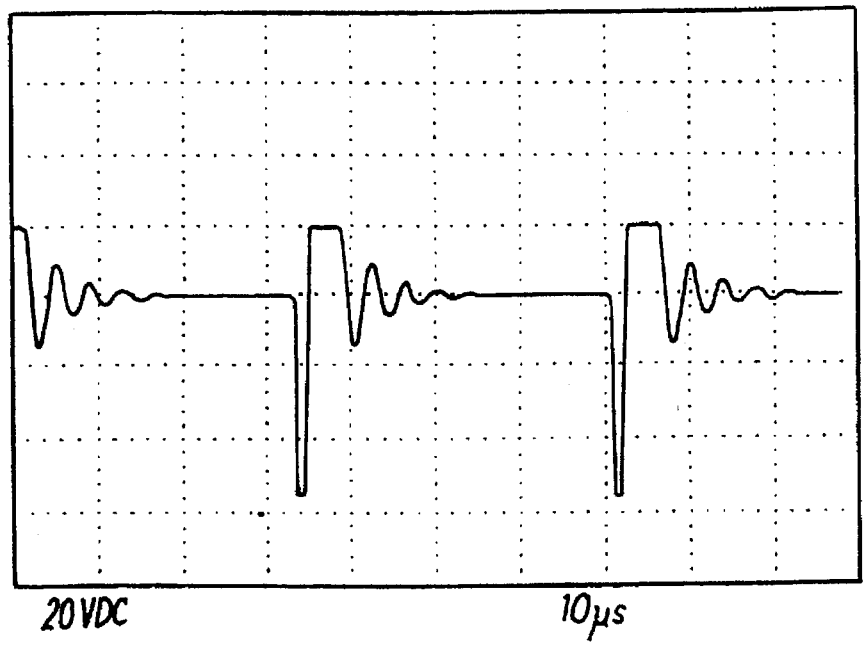
FIGS. 2a and 2b illustrate waveforms in the operation of the circuit of FIG. 1.
Figure 2B:
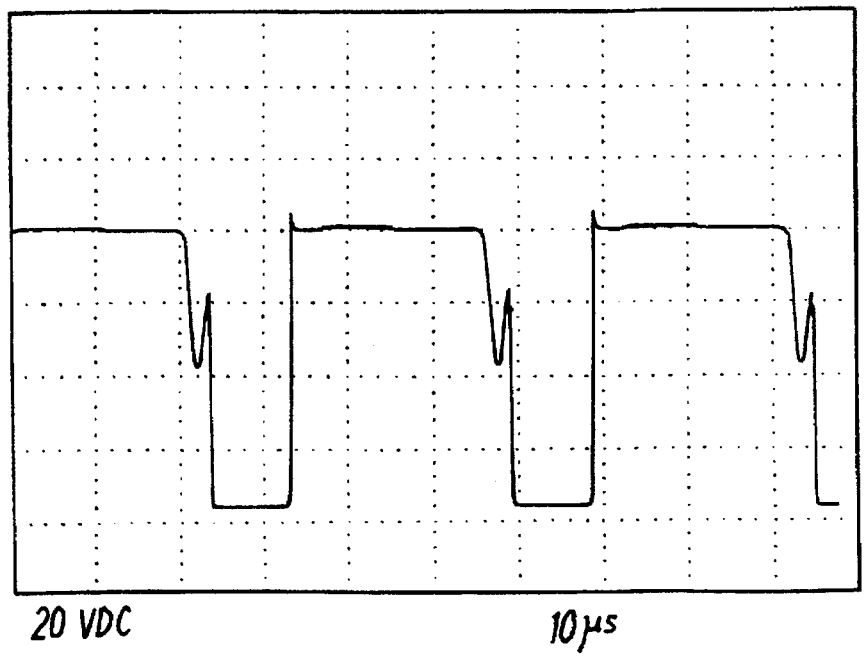

FIGS. 2a and 2b show the waveforms of the drain-source voltage of the power switching transistor Q5 at 17 mW load power and 854 mW load power respectively.

Figure 3:
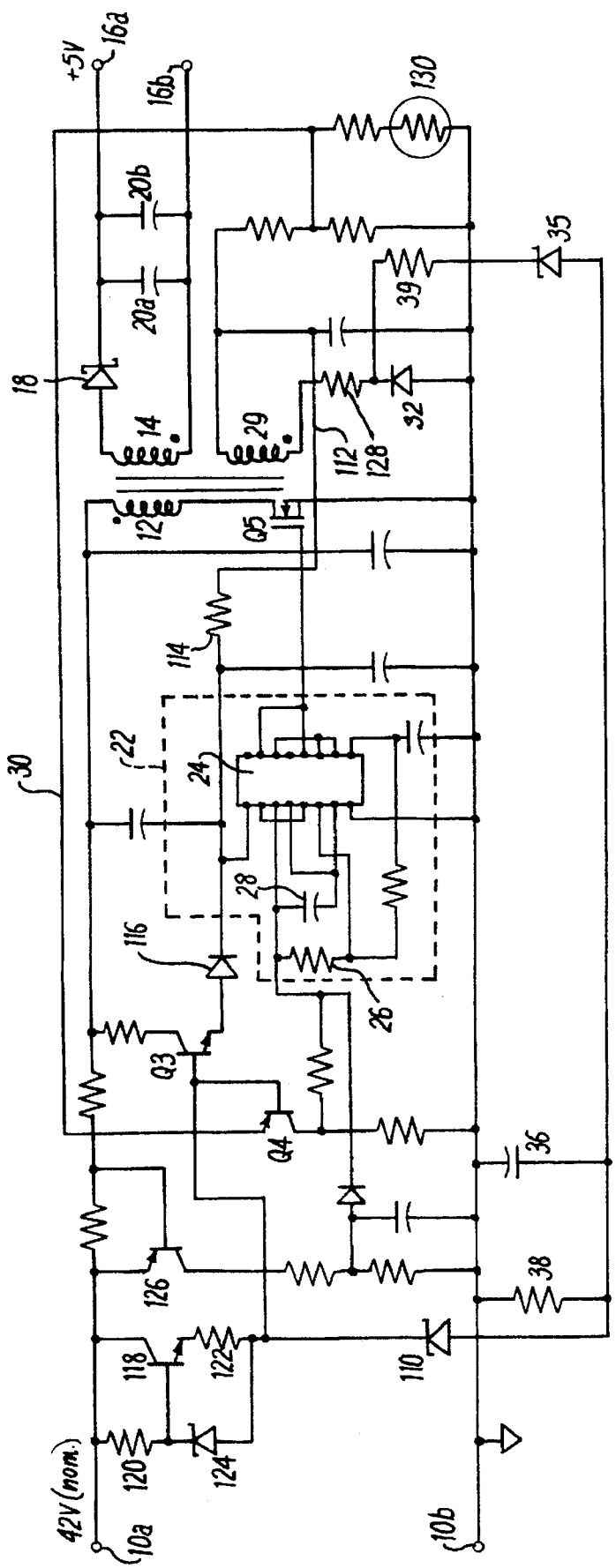
FIG. 3 is a circuit diagram of a modified embodiment.

The embodiment of FIG. 3 is similar to that of FIG. 1, and like references denote like parts. This embodiment, however, is modified in several regards.

Firstly, the voltage reference source comprises a bandgap device 110 in place of the mosfet pair Q1, Q2. A particularly suitable bandgap device is available from Zerex (UK) which gives a 3.3 V reference with a reference current of only 10 to 15 μA. The reference voltage produced by a bandgap device is much less temperature variable than that obtained from a mosfet source.

Secondly, for tighter control the oscillator 22 is bootstrapped from the secondary regulator winding 29. After startup, the rectified reference voltage at winding 29 passes by line 112 via resistor 114 to the +bus input of the oscillator IC 24, a diode 116 being inserted between the +bus input and its current source. This effectively bootstraps the primary section from the output reference, and gives a further improvement in efficiency.

The transistor 118 together with resistors 120, 122 and diode 124 form a constant current source in series with the bandgap device 110, in place of the simple resistor 25 in FIG. 1. This holds the reference current at a fixed value, typically 12 μA, as the input voltage varies from 24 V to 60 V, and further increases the system efficiency. Transistor 126 acts as a current limit circuit controlling the on time of the oscillator 22.

A further modification is the provision of a low value resistor 128 in series with the reference winding 29 and the peak-rectifying diode 32. In very low load conditions, the lack of damping from the load leads to the generation of voltage spikes which would make the peak-rectified voltage inaccurate. The resistor 128 removes these spikes.

The embodiment of FIG. 3 also has a thermistor 130 between the voltage feedback path and ground, to improve the temperature stability of the circuit.

The invention thus provides a dc-dc converter which can deal with exceptionally low powers and can be implemented at very low cost.

I claim:

1. A dc-dc converter comprising:
   an input for receiving an input voltage;
   a transformer having primary and secondary windings and producing a secondary side voltage;
   switching means operative to switch the input voltage across the transformer primary winding;
   oscillator means connected to the switching means to cause the switching means to operate repetitively;
   an output coupled to the transformer secondary winding via a low-pass filter;

a control circuit for controlling the operation of the oscillator means to regulate an output voltage;

a primary-side voltage reference source; and feedback means generating a feedback signal which varies with at least one parameter of the secondary side voltage;

and in which the feedback means is operative to provide a feedback signal representative of the output voltage and an on-time of the switching means; and the converter further includes means for providing to the primary-side voltage reference source a variable dc offset which varies with the on time of the switching means to modify the output of the primary-side voltage reference source.

2. A converter according to claim 1, in which a low value resistor is connected in series with the auxiliary secondary winding and its peak rectifier to remove transient spikes from the voltage to be rectified.

3. A converter according to claim 1, in which the primary-side voltage reference source is a bandgap device.

4. A converter according to claim 1, in which the primary-side voltage reference source comprises one or more mosfet devices in series with a high value resistance to provide a reference from the gate-drain voltage drop.

5. A converter according to claim 1, which the oscillator means comprises an integrated circuit ring-of-three oscillator.

6. A converter according to claim 5, in which said integrated circuit oscillator is provided with external components to provide a propagation delay.

7. A converter according to claim 1, further including a bootstrap circuit between the output side and the oscillator means.

8. A converter according to claim 1, in which the converter is capable of providing a regulated output voltage with a total power consumption in lead and converter less than 25 mW.

9. A converter according to claim 8, in which the converter is also capable of providing a regulated output voltage with a total power consumption of at least 850 mW.

10. A converter according to claim 1, in which the feedback means comprises an auxiliary secondary winding wound with the primary and secondary windings on a common core, the secondary winding and the auxiliary secondary winding being wound bifilar fashion, and the auxiliary winding being connected to apply a peak-rectified feedback signal to the oscillator means.

11. A converter according to claim 10, in which said means for providing a variable dc offset is provided by the auxiliary secondary winding being further connected with a chopper diode to supply a fixed voltage signal during the on time of the switching means, and low-pass filter means having an input connected to the primary-side voltage reference source to modify the output of the primary-side voltage reference source.

* * * * *

UNITED STATES PATENT AND TRADE MARK OFFICE
CERTIFICATE OF CORRECTION

PATENT NO.   : 5,629,841
DATED        : May 13, 1997
INVENTOR(S)  : Brian E. Attwood It is certified that error appears in the above-identified patent and that said Letters Patent is hereby corrected as shown below:

Column 6, Claim 8, Line 8, after "in" delete "lead" and insert --load--.

Signed and Sealed this

Ninth Day of December, 1997

Attest:

Attesting Officer

BRUCE LEHMAN

Commissioner of Patents and Trademarks